(12) United States Patent
Paepke

(10) Patent No.: US 6,249,785 B1
(45) Date of Patent: Jun. 19, 2001

(54) METHOD FOR PREDICTING RATINGS

(75) Inventor: C. Owen Paepke, Phoenix, AZ (US)

(73) Assignee: MediaChoice, Inc., Pheonix, AZ (US)

( * ) Notice: Subject to any disclaimer, the term of this patent is extended or adjusted under 35 U.S.C. 154(b) by 0 days.

(21) Appl. No.: 09/306,550

(22) Filed: May 6, 1999

(51) Int. Cl.$^7$ .................................................. G06F 17/30
(52) U.S. Cl. ....................................... 707/5; 707/7
(58) Field of Search ............................. 707/5, 6, 7

(56) References Cited

U.S. PATENT DOCUMENTS

| | | | |
|---|---|---|---|
| 4,613,946 | * 9/1986 | Forman | 364/518 |
| 4,870,579 | 9/1989 | Hey | 705/27 |
| 4,996,642 | 2/1991 | Hey | 705/27 |
| 5,583,763 | 12/1996 | Atcheson et al. | 707/3 |
| 5,749,081 | 5/1998 | Whiteis | 709/102 |
| 5,758,026 | * 5/1998 | Lobley et al. | 395/12 |
| 5,790,426 | * 8/1998 | Robinson | 364/554 |
| 5,884,282 | * 3/1999 | Robinson | 705/27 |
| 5,933,516 | * 8/1999 | Tu et al. | 382/125 |
| 6,016,475 | * 1/2000 | Miller et al. | 705/1 |
| 6,029,195 | * 2/2000 | Herz | 709/219 |
| 6,092,049 | * 7/2000 | Chislenko et al. | 705/10 |
| 6,112,186 | * 8/2000 | Bergh et al. | 705/10 |

* cited by examiner

Primary Examiner—Jack Choules
Assistant Examiner—Linh M Pham
(74) Attorney, Agent, or Firm—Fennemore Craig, P.C.; Paul F. Wille

(57) ABSTRACT

Predictions are based primarily upon similarities in pairs of ratings, irrespective of the actual value of the ratings. A table is used to translate each pair of ratings into rankings that are used to make predictions of future ratings. Similar ratings are ranked higher than dissimilar ratings. The prediction is based upon the average ($z$) of the books linked to the book of interest, as rated by the user, plus the difference ($\delta$) between the average rating of the book of interest, as rated by all users, and the average ratings of the linked books, as rated by the user. The averages may be weighted by the rankings. Alternatively, the prediction is based upon the cumulative values applied to books linked to the books rated by the user, where the values are based upon the user's ratings of the rated books.

16 Claims, 16 Drawing Sheets

Book Ratings

| | Reader #1 | Reader #2 | Reader #3 | Reader #4 |
|---|---|---|---|---|
| A | 9 | 5 | 5 | 7 |
| B | – | 10 | – | – |
| C | 6 | 8 | 9 | 4 |
| D | 6 | 8 | – | 4 |
| E | 9 | – | – | – |
| F | 10 | – | 8 | 9 |
| G | 9 | – | 6 | 7 |
| H | 9 | 8 | 5 | 7 |
| J | – | 8 | 2 | – |
| K | 6 | 9 | 8 | 4 |

Book Ratings

| | Reader #1 | Reader #2 | Reader #3 | Reader #4 |
|---|---|---|---|---|
| A | 9 | 5 | 5 | 7 |
| B | – | 10 | – | – |
| C | 6 | 8 | 9 | 4 |
| D | 6 | 8 | – | 4 |
| E | 9 | – | – | – |
| F | 10 | – | 8 | 9 |
| G | 9 | – | 6 | 7 |
| H | 9 | 8 | 5 | 7 |
| J | – | 8 | 2 | – |
| K | 6 | 9 | 8 | 4 |

FIG. 1

Book Pairs – Reader 2     22

|   | A | B | C | D | E | F | G | H | J | K |
|---|---|---|---|---|---|---|---|---|---|---|
| K | (9-5) -.3 | (10-9) .8 | (9-8) .7 | (9-8) .7 | | | | (9-8) .7 | (9-8) .7 | |
| J | (8-5) -.3 | (10-8) .4 | (8-8) .9 | (8-8) .9 | | | | (8-8) .9 | | |
| H | (8-5) -.3 | (10-8) .4 | (8-8) .9 | (8-8) .9 | | | | | | |
| G | | | | | | | | | | |
| F | | | | | | | | | | |
| E | | | | | | | | | | |
| D | (8-5) -.3 | (10-8) .4 | (8-8) .9 | | | | | | | |
| C | (8-5) -.3 | (10-8) .4 | | | | | | | | |
| B | (10-5) -.3 | | | | | | | | | |
| A | | | | | | | | | | |

FIG. 4

Book Pairs – Reader 3

| | A | B | C | D | E | F | G | H | J | K |
|---|---|---|---|---|---|---|---|---|---|---|
| K | (8-5) -.3 | | (9-8) .7 | | | (8-8) .9 | (8-6) .2 | (8-5) -.3 | (8-2) -.6 | |
| J | (5-2) -.2 | | (9-2) -.6 | | | (8-2) -.6 | (6-2) -.3 | (5-2) -.2 | | |
| H | (5-5) .7 | | (9-5) -.3 | | | (8-5) -.3 | (6-5) .4 | | | |
| G | (6-5) .4 | | (9-6) -.2 | | | (8-6) .2 | | | | |
| F | (8-5) -.3 | | (9-8) .7 | | | | | | | |
| E | | | | | | | | | | |
| D | | | | | | | | | | |
| C | (9-5) -.3 | | | | | | | | | |
| B | | | | | | | | | | |
| A | | | | | | | | | | |

FIG. 5

Number and Sum of Coefficients 41

| | A | B | C | D | E | F | G | H | J | K |
|---|---|---|---|---|---|---|---|---|---|---|
| K | (4) −1.3 | (1) .8 | (4) 2.9 | (3) 2.2 | (1) −.2 | (3) .3 | (3) −.5 | (4) −1.7 | (3) 1.3 | |
| J | (2) −.5 | (1) .4 | (2) .3 | (1) .9 | | (1) −.6 | (1) −.3 | (2) .7 | | |
| H | (4) 2.2 | (1) .4 | (4) −.1 | (3) .2 | | (3) .8 | (3) 2.2 | | | |
| G | (3) 2.2 | | (3) −.9 | (2) −.7 | | (3) 1.3 | | | | |
| F | (3) .8 | | (3) .1 | (2) −.6 | (1) .8 | | | | | |
| E | (1) 1 | | (1) −.2 | (1) −.2 | | | | | | |
| D | (3) −1.1 | (1) .4 | (3) 2.4 | | | | | | | |
| C | (4) −1.3 | (1) .4 | | | | | | | | |
| B | (1) −.3 | | | | | | | | | |
| A | | | | | | | | | | |

Average Positive Coefficients

|   | A | B | C | D | E | F | G | H | J | K |
|---|---|---|---|---|---|---|---|---|---|---|
| K |   | .800 | .725 | .733 |   | .100 |   |   | .433 |   |
| J |   | .400 | .150 | .900 |   |   |   | .350 |   |   |
| H | .550 | .400 |   | .066 |   | .233 | .733 |   |   |   |
| G | .733 |   |   |   |   | .433 |   |   |   |   |
| F | .266 |   | .033 |   | .800 |   |   |   |   |   |
| E | 1.000 |   |   |   |   |   |   |   |   |   |
| D |   | .400 | .800 |   |   |   |   |   |   |   |
| C |   | .400 |   |   |   |   |   |   |   |   |
| B |   |   |   |   |   |   |   |   |   |   |
| A |   |   |   |   |   |   |   |   |   |   |

Book Predictions

| | Reader #1 | Reader #2 | Reader #3 | Reader #4 |
|---|---|---|---|---|
| A | 9 | 5 | 5 | 7 |
| B | | 10 | | |
| C | 6 | 8 | 9 | 4 |
| D | 6 | 8 | (8.5 ± adj.) = ·8· | 4 |
| E | 9 | | | |
| F | 10 | | 8 | 9 |
| G | 9 | (6.5 ± adj.) = ·7· | 6 | 7 |
| H | 9 | 8 | 5 | 7 |
| J | | 8 | 2 | |
| K | 6 | 9 | 8 | 4 |

FIG. 12

| reader # | book # | rating |
|---|---|---|
| 1 | A | 9 |
| 1 | B | 8 |
| 1 | C | 7 |
| 1 | D | 5 |
| 1 | E | 8 |
| 1 | F | 7 |
| 2 | A | 8 |
| 2 | D | 6 |
| 2 | F | 8 |
| 2 | G | 5 |
| 2 | H | 7 |
| 2 | J | 4 |
| 3 | A | 9 |
| 3 | C | 8 |
| 3 | F | 8 |
| 3 | H | 7 |
| 3 | K | 8 |
| 3 | L | 8 |
| | | |
| | | |

FIG. 13

| reader # | reader name | demographics | flags | | |
|---|---|---|---|---|---|
| 1 | | | | | |
| 2 | | | | | |
| 3 | | | | | |
| 7 | | | | | |
| 31 | | | | | |
| 44 | | | | | |
| ... | | | | | |
| n | | | | | |

FIG. 14

| book # | Title, author, ISBN, keyword, ... |
|---|---|
| 003 | |
| 111 | |
| 112 | |
| 113 | |
| 455 | |
| 768 | |
| ... | |
| n | |

FIG. 15 higher rating

| | 1 | 2 | 3 | 4 | 5 | 6 | 7 | 8 | 9 | 10 |
|---|---|---|---|---|---|---|---|---|---|---|
| 10 | −1 | −1 | −1 | −.9 | −.9 | −.6 | −.4 | 0 | .6 | 1 |
| 9 | −1 | −1 | −.9 | −.8 | −.6 | −.4 | 0 | .5 | .9 | |
| 8 | −1 | −1 | −.7 | −.6 | −.4 | 0 | .4 | .7 | | |
| 7 | −1 | −.8 | −.5 | −.4 | 0 | .5 | .7 | | | |
| 6 | −.7 | −.5 | −.3 | 0 | .5 | .8 | | | | |
| 5 | −.3 | −.2 | 0 | .4 | .8 | | | | | |
| 4 | 0 | .1 | .5 | .8 | | | | | | |
| 3 | .4 | .5 | .9 | | | | | | | |
| 2 | .8 | 1 | | | | | | | | |
| 1 | 1 | | | | | | | | | | lower rating

150 — Table of Rating Coefficients

FIG. 22

METHOD FOR PREDICTING RATINGS

COPYRIGHT AUTHORIZATION

A portion of this patent document contains unpublished material that is subject to copyright. The copyright owner has no objection to the facsimile reproduction by anyone of the patent document or the patent disclosure, as it appears in the patent file or records of the U.S. Patent and Trademark Office, but otherwise reserves all rights to copy or reproduce the copyrighted material in any form.

BACKGROUND OF THE INVENTION

1. Field of Invention

This invention relates to an apparatus and a method for reliably predicting subjective evaluations by a person and, in particular, to an apparatus and a method for predicting an evaluation based upon links established by previous evaluations by the person and other people.

2. Prior Art

As society's inundation with information continues or even worsens, mechanisms such as web browsers have been provided to enable technically unsophisticated people to use or to manipulate complex systems. Another such mechanism is a computerized system for preselecting items for a user based upon previous choices or explicit preferences from the user. Several such systems are described in the prior art and each suffers from the inability to reliably predict subjective reaction, i.e. a response based upon taste, not upon a need for factual information.

Subjective responses generally relate to objects of art, such as books, magazines, movies, plays, or music, including objects literally of taste, e.g. beer, wine, cigars or, more broadly, restaurants. The invention is described in terms of rating books even though the invention has much broader utility.

The prior art can be broadly divided between systems that focus on the user, e.g. trying to find users with similar tastes, or on the item, e.g. a popular book is likely to be well received by a new reader. A problem with focusing on the user is the fact that individual rating patterns can vary widely. For example, many people rate things within the upper portion of a range, e.g. on a scale of 1–10, most or all ratings are in the range of 6–9. A minority use the whole scale and another minority use a lower but narrow sub-scale such as 3–7.

Focusing on the user also has the problem that the results will be distorted by eclectic tastes. Trying to find a pattern among people who seemingly have no pattern to their choices is fruitless.

Focusing on the item essentially ignores the subjective tastes of people. For a database serving a large number of users, raw popularity data may be effective for a limited number of choices. For evaluating books, for example, where few may have read a given title, the sample size is too small to validly predict choice based simply on popularity.

U.S. Pat. No. 4,870,579 (Hey) discloses a system that focuses on the user in that one or more other users are designated as predicting users because of common choices. A weighting factor is included to adjust for differences in ratings among the predicting users.

U.S. Pat. No. 5,583,763 (Atcheson et al.) discloses a somewhat more straight-forward approach. A user's preferences are compared with others. When a significant number of matches are found between the two users, unmatched entries from a second user are suggested to the first user.

U.S. Pat. No. 5,749,081 (Whiteis) discloses a system that focuses on the items. The system makes recommendations based upon how many times an item known to the user is linked with other items not known to the user. The system searches through a list of items that are paired or linked with the items chosen by the user, along with the number of times each pair occurs. The items that are most frequently linked with the user's selected items are displayed as recommended items.

In view of the foregoing, it is therefore an object of the invention to provide an apparatus and method for accurately predicting a person's subjective choices.

Another object of the invention is to provide an apparatus and method for recommending items to a person based upon accurate estimates of a favorable reaction to the recommendation.

A further object of the invention is to provide an apparatus and method for accurately predicting subjective choices that is unaffected by individual rating patterns.

Another object of the invention is to provide an apparatus and method for accurately predicting subjective choices even when the number of ratings for a given item is relatively small, e.g. less than ten.

SUMMARY OF THE INVENTION

The foregoing objects are achieved in this invention in which books or other items are paired and all possible combinations of pairs or links are identified. The number of links is reduced based primarily on similarity of rating and secondarily on frequency of rating. The remaining links are used to make a prediction based upon the average rating ($z$) of the books, as rated by the user, linked to the book of interest plus the difference ($\delta$) between the average rating of the book of interest, as rated by all users, minus the average ratings of the linked books, as rated by all users. The averages of the linked books are weighted by similarity. In an alternative embodiment of the invention, the prediction is based upon the average of values applied to books linked to the book of interest, where the values are based upon ratings of the linked books by the user inquiring about the book of interest.

BRIEF DESCRIPTION OF THE DRAWINGS

A more complete understanding of the invention can be obtained by considering the following detailed description in conjunction with the accompanying drawings, in which:

FIG. 1 is a table of ratings used in explaining the operation of the invention;

FIG. 4 is a table of rating pairs from a second reader;

FIG. 5 is a table of rating pairs from a third reader;

FIG. 9 is a table of averaged, positive coefficients;

FIG. 12 is a table including predicted ratings;

FIG. 13 is a representation of rating data in the memory of a computer;

FIG. 14 is a representation of reader data in the memory of a computer;

FIG. 15 is a representation of book data in the memory of a computer;

FIG. 22 is a table of data from a relational database implementing the invention.

DETAILED DESCRIPTION OF THE INVENTION

FIG. 1 is a table showing the ratings of ten books by four readers, not all of whom have read all ten books. This table is taken from a larger database and is provided solely to illustrate the invention. The data shown is typical in that the readers do not use the full rating scale. Also, reader #1 and reader #2 tend to rate books more highly than reader #3 or reader #4. The scale of 1–10 is arbitrary. Too few integers coarsens the data. Too many integers tires the person rating the books.

The data is atypical in that the four readers have read a high percentage of the books listed. Books that have not been read or rated are indicated by a hyphen. In an actual database, the percentage of books read by all readers was two to fifteen percent.

In accordance with the invention, the books are paired in all combinations, producing $_nC_2$ pairs per reader, where n is the number of books in the database and $_nC_2$ is the combination of n books taken two at a time. As one can imagine, pairing n books can produce a significant amount of data, $\{\frac{1}{2}(n)\cdot(n-1)\}$ pairs. Because not all books are read by all readers, most of the pairs are null sets and the amount of data that actually needs to be stored is much less than theoretically possible.

Figure 2:
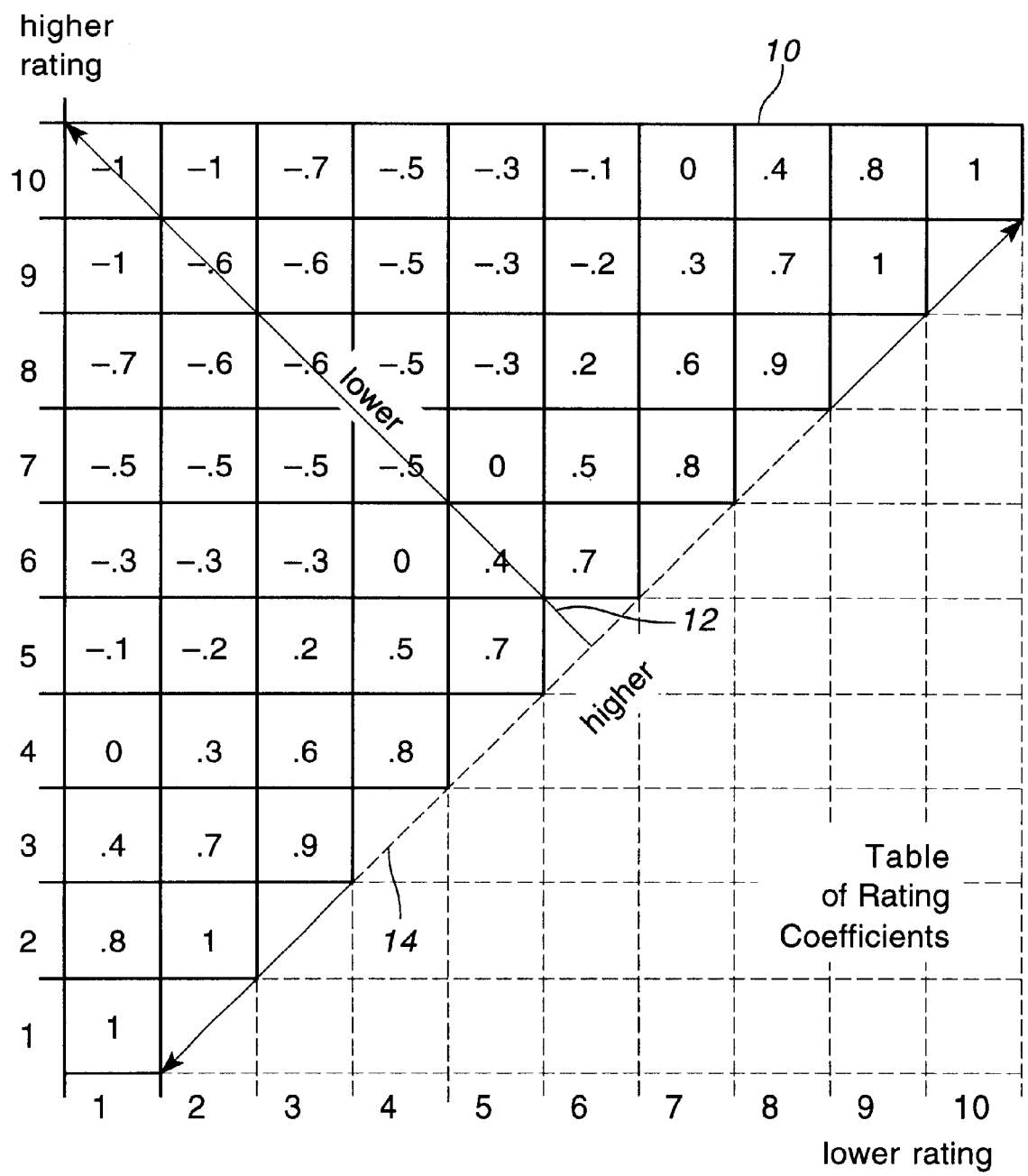
FIG. 2 is a table of coefficients substituted for given pairs of ratings.

Each pair in which both books were rated is then ranked according to a table, illustrated in FIG. 2. The data in the table affects all subsequent calculations and, in effect, evaluates the pairs for similarity (equal ratings scoring highest). Ranking the pairs by similarity is one of the features of the invention that enables the invention to predict accurately.

The numbers in table 10 in FIG. 2 are arbitrary, subject to change depending upon a particular application. The relation of the numbers is important but not absolute. As indicated by arrow 12, the numbers decrease as one moves away from the major diagonal of the table. The major diagonal is formed by the pairs of equal ratings; 1—1, 2—2, . . . , 10—10. It has been found, at least for books, that ratings in the middle of the scale are less significant than ratings at each end of the scale. Thus, the numbers are higher for pairs 1—1 and 10—10 than they are for pairs 5—5 and 6—6, as indicated by double ended arrow 14. How much higher or lower is readily determined empirically when real data is available for a particular application. The data illustrated is a viable starting point.

The pairs are ranked on a scale of −1 to +1, with −1 being the lowest rank. Any range of numbers could be used. This particular range was chosen for speed in calculation. Detecting a negative number or zero is computationally much faster than comparing numbers because of the zero, negative, and carry flags in microprocessors.

As illustrated in FIG. 2, arrow 12 appears to be an axis of symmetry extending along a diagonal to the corner of the table. This need not be the case and, in fact, is not the case for a database of books actually tested; see FIG. 19. The axis of symmetry was, in effect, moved (translated) to the right in the actual table. This is believed due to the tendency of people to rate books using the upper portion of the scale rather than the full scale. The axis can be translated in either direction or be rotated instead of or in addition to being translated, depending upon application.

Figure 3:
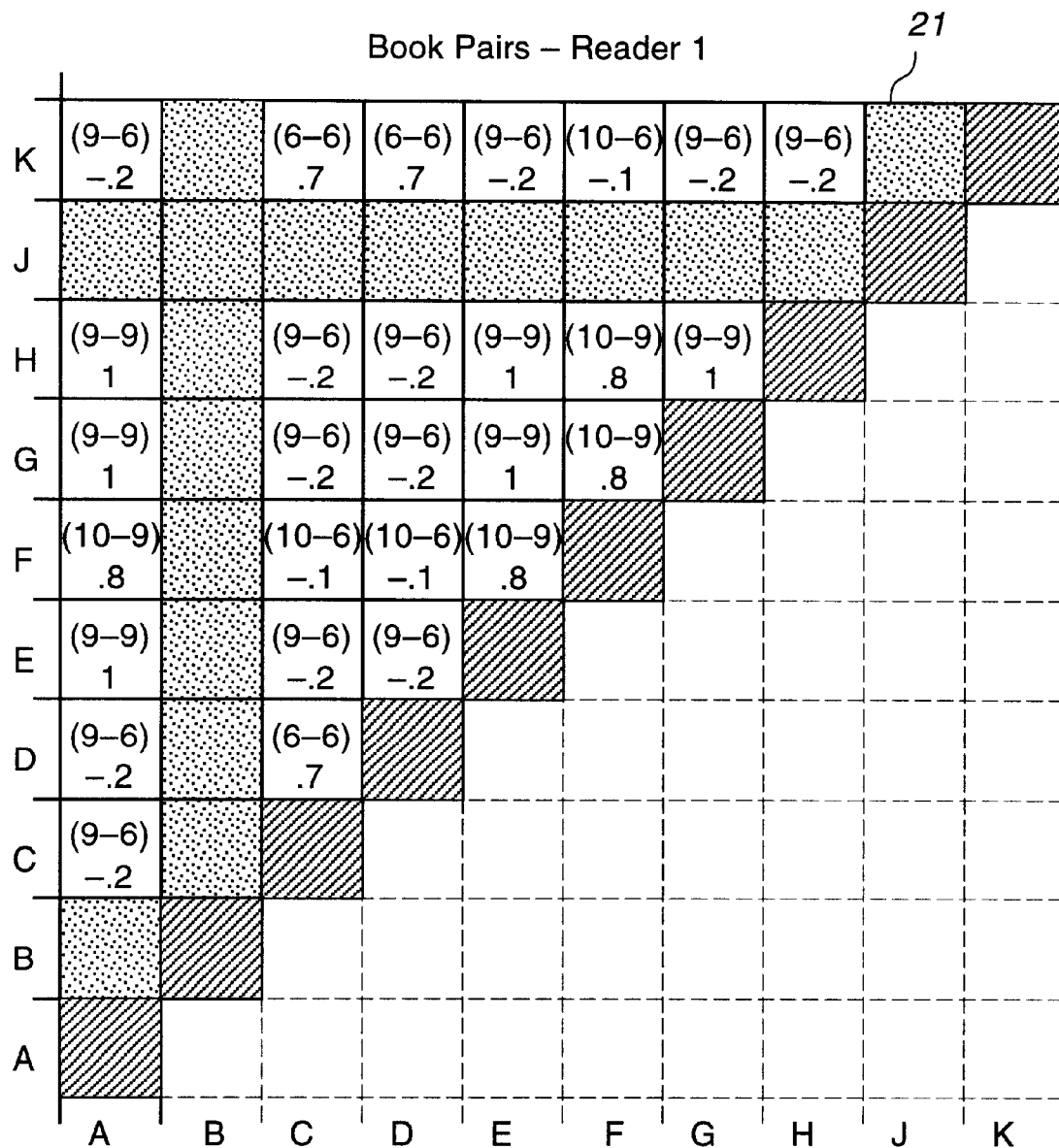
FIG. 3 is a table of rating pairs from a first reader.

In FIG. 3, table 21 represents the pairs resulting from the ratings by reader #1. In each square are the rating of the books in the pair and the coefficient from the table of FIG. 2. The higher rating is listed first. The squares that are stippled represent the pairs in which at least one book of the pair was not rated. Looking at FIG. 1, reader #1 rated book A as a 9 and book C as a 6. In FIG. 3, the square located at the intersection of column A and row C contains this data as "(9-6)". In FIG. 2, the coefficient in the square at the intersection of column 6 and row 9 is "−0.2" and this information is also presented in square A,C in FIG. 3.

Figure 6:
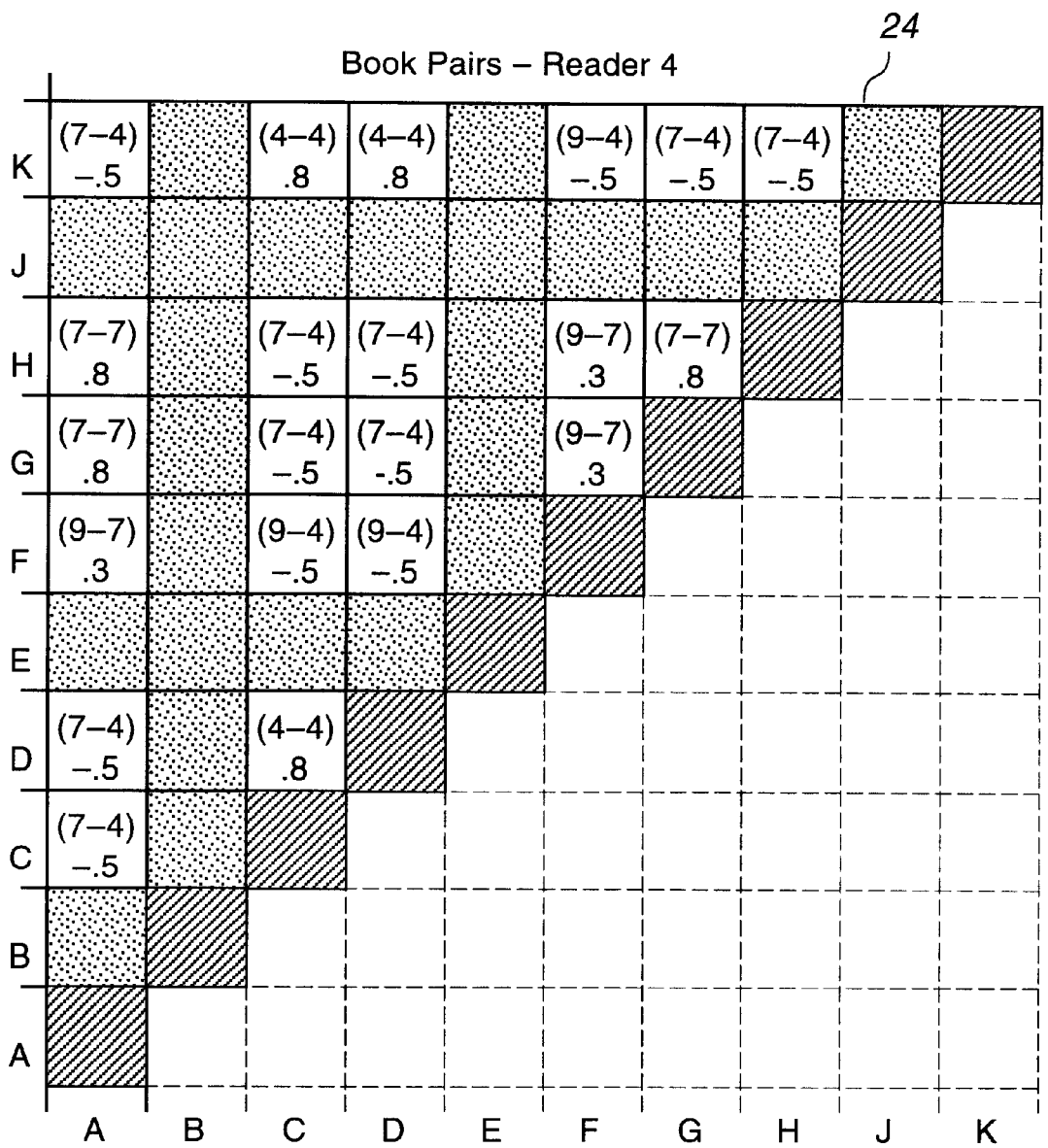
FIG. 6 is a table of rating pairs from a fourth reader.

In FIG. 4, table 22 contains the data from reader #2, constructed from the data in FIG. 1 and FIG. 2 as described above in connection with FIG. 3. In FIG. 5, table 23 contains the data from reader #3, constructed from the data in FIG. 1 and FIG. 2 as described above. In FIG. 6, table 24 contains the data from reader #4, constructed from the data in FIG. 1 and FIG. 2 as described above.

The data in tables 21, 22, 23, and 24 need not be stored as such in a computer but represents intermediate results that facilitate understanding the operation of the invention. The coefficients are summed and the number of pairs contributing to the sum is tracked for averaging the coefficients and for weighting the averages.

Figures 7, 8:
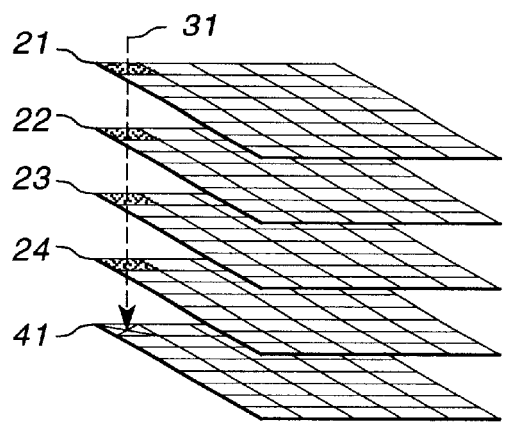
FIG. 7 illustrates combining data in accordance with the invention.
FIG. 8 is a table of partially processed coefficients used in explaining the operation of the invention.

FIG. 7 illustrates summing the coefficients of each possible pair of books. Specifically, arrow 31 represents the summing of each coefficient, if any, for pair A,K for all readers (in this example, four readers) and storing the results at location A,K of table 41 in FIG. 8. It can be seen from FIGS. 3, 4, 5, and 6 that location A,K contributes four coefficients, location B,K contributes only one coefficient, and so on throughout the table.

In FIG. 9, table 46 shows the results of summing the coefficients, ignoring negative totals, and dividing positive totals by the number of contributing pairs. As with table 41 (FIG. 8), table 46 contains intermediate results that need not necessarily be stored.

Figure 10:
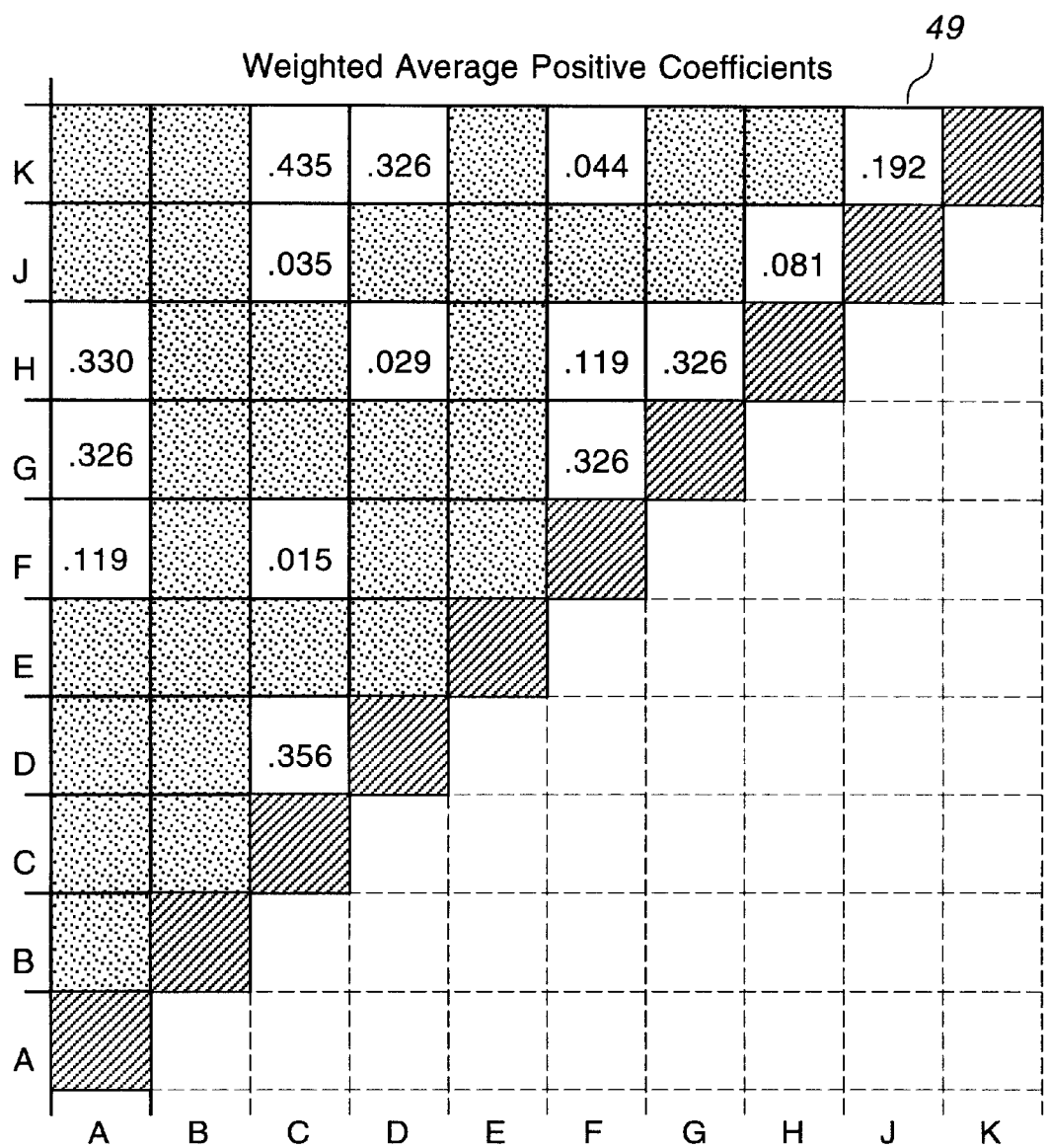
FIG. 10 is a table of weighted, averaged, positive coefficients.

In FIG. 10, table 49 contains the results of weighting the average positive coefficients. The weighting function eliminates averages resulting from a single pair of ratings and reduces averages based upon only a few pairs of ratings. The effect of the weighting function is to give greater weight to ratings that are close together or to ratings that are more numerous, or both. The particular weighting function chosen depends upon the number of pairs and the desired accuracy of prediction. In one embodiment of the invention, the following weighting function was used (p is the number of pairs of ratings).

$$W=(p-1)/(p+1)$$

A more severe weighting function, requiring a higher average from fewer pairs, was used in another embodiment of the invention. The more severe weighting function is defined as follows.

$$W=(p^2-1)/(p^2+9)$$

Alternatively, one could simply define the weighting function as values in a look-up table. The second weighting function as a look-up table is as follows.

| p | W |
|---|---|
| 1 | 0 |
| 2 | 0.23 |
| 3 | 0.44 |
| 4 | 0.60 |
| etc. | |

Figure 11:
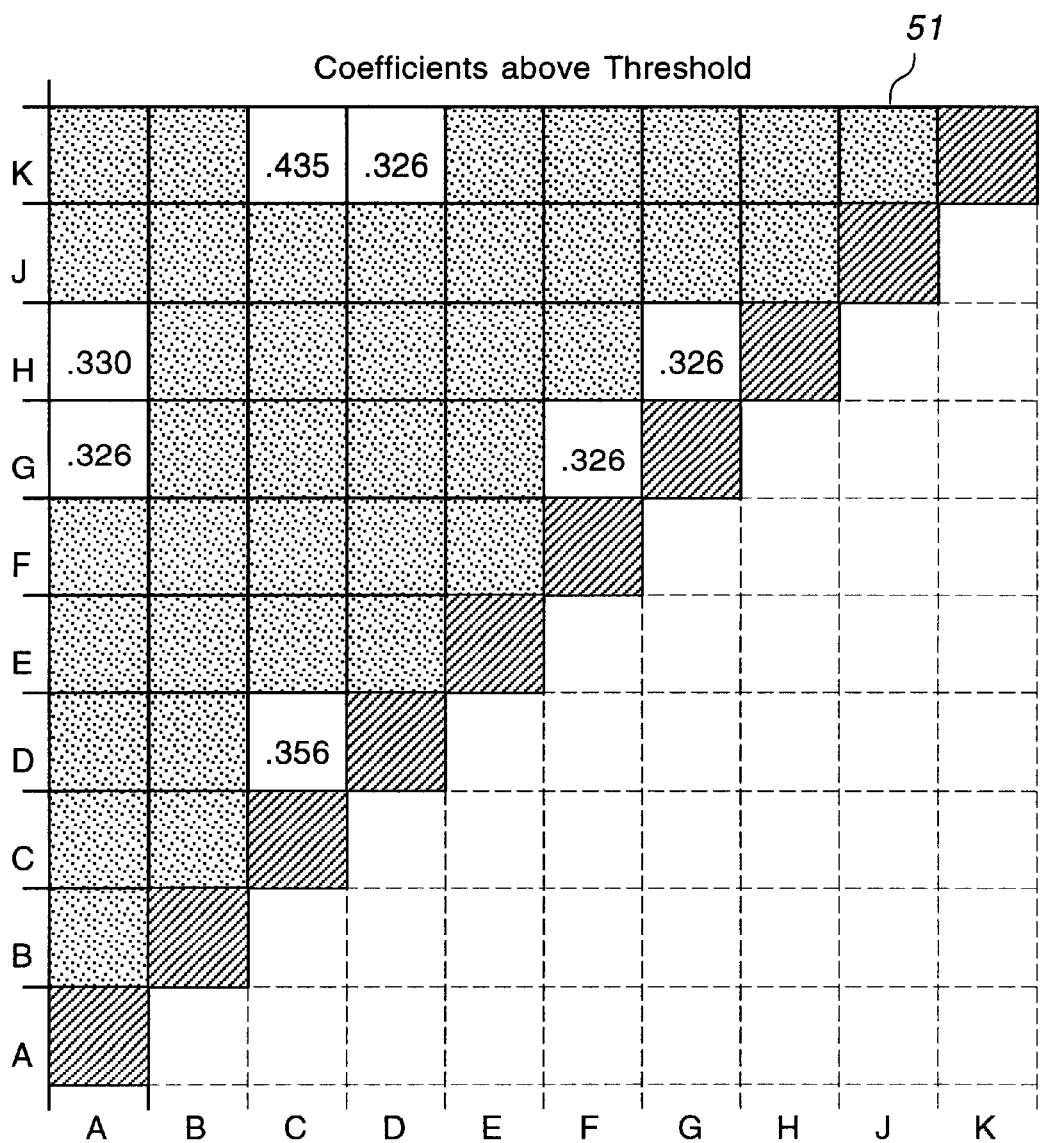
FIG. 11 is a table of coefficients suitable for use in predicting ratings of unrated items.

In FIG. 10, table 49 is a map of the average positive coefficients multiplied by the weighting function. If one compares FIG. 10 with FIG. 8, it is clear that there are no coefficients remaining that are based upon a single pair of rated books. In FIG. 11, table 51 represents the weighted, average, positive coefficients above a predetermined threshold. In one embodiment of the invention, the threshold was 0.36. For the sake of this example, with such a small population of books, the threshold is 0.30.

What are left in table 51 are the coefficients and identities of links (pairs) that can reliably be used to predict the response to an unrated book by a given reader. FIGS. 8, 9, 10, and 11 represent a winnowing process for finding the desired coefficients. The winnowing process looks at similarity of rating and the numbers of ratings for the desired coefficients. Once found, the coefficients are used to predict a reader's response to a book that he has not read.

FIG. 12 is the same as FIG. 1 with the addition of two predictions. In accordance with the invention, any book that was not rated by a reader can be the subject of a prediction if there are at least two links between that book and other books. Looking at book B in FIG. 12, three people have not read the book. In table 51 (FIG. 11), neither row B nor column B has any links. Therefore, there is insufficient information to make a prediction about book B.

Reader #2 has not read book G. According to table 51 (FIG. 11), book A is linked to book G (column A) and book H is linked to book G (row H). Reader #2 has read book A and book H. Therefore, there is sufficient information to make a prediction about book G for reader #2.

Because the reader has read the linked books, the reader's own scale of evaluation is used to provide a predicted value. Thus, it does not matter whether a reader tends to rate high, low, or in a condensed range somewhere in the scale of one to ten. The predicted rating will track the reader's rating technique.

The coefficients shown in table 51 (FIG. 11) are quantized to one of eight levels. The quantizing steps are not linearly related and are adjusted to minimize the difference between predicted and actual ratings as the database is developed. At present, the quantizing table is as follows.

TABLE 55

| from | to | ρ |
|---|---|---|
| 0.00 | 0.10 | 0.00 |
| >0.10 | 0.20 | 0.10 |
| >0.20 | 0.30 | 0.20 |
| >0.30 | 0.40 | 0.35 |
| >0.40 | 0.45 | 0.50 |
| >0.45 | 0.50 | 0.65 |
| >0.50 | 0.55 | 0.80 |
| >0.55 | 1.00 | 1.00 |

Rho (ρ) is determined by quantizing the coefficients from table 51 (FIG. 11) in accordance with table 55 above. ρ is applied to the average ratings of the linked books, i.e. their popularity, to make a prediction.

EXAMPLE 1

Reader #2 wants a predicted rating for book G, for which links exist in table 51 (FIG. 11) to books A and H. Link A,G has a ρ of 0.35 (see FIG. 11 and table 55), as does link G,H. Reader #2 has rated book A as 5 and rated book H as 8, for a weighted average rating, z, of 6.5 calculated as follows.

$$z = \frac{\sum (r \cdot \rho)}{\sum \rho}$$

$$z = \frac{(5 \cdot 0.35) + (8 \cdot 0.35)}{0.35 + 0.35} = 6.50$$

The predicted rating is this weighted average rating of the linked books (6.5) plus or minus the difference, δ, between the average rating of the subject book, i.e. the popularity of book, G, and the weighted averages of the ratings of the linking books. The averages are also weighted in accordance with the quantized data from table 55 and, therefore, in accordance with the similarities of the ratings.

$$y = \frac{\sum (r \cdot \rho)}{\sum \rho}$$

Substituting the values from table 55 (FIG. 11) and from FIG. 12 produces the following. (The average rating of book A by all readers is 6.5, the average rating of book H by all readers is 7.25, and the average rating of book G by all readers is 7.33.)

$$y = \frac{(6.5 \cdot 0.35) + (7.25 \cdot 0.35)}{0.35 + 0.35} = 6.88$$

7.33−6.88=0.45=δ z+δ=*rating*

6.50−0.45=6.95

Thus, the predicted rating, after rounding, of book G for reader #2 is 7.

EXAMPLE 2

For reader #3, sufficient data is available to predict a rating for book D. From table 51 (FIG. 11), book D is seen to be linked to book C (see row D) and book K (see column D). Reader #3 read both of these books and their weighted average rating is 8.5.

The average rating of book C by all readers is 6.75, the average rating of book D by all readers is 6.0, and the average rating of book K by all readers is 6.75.

$$y = \frac{(6.75 \cdot 0.35) + (6.75 \cdot 0.35)}{0.35 + 0.35} = 6.75$$

The difference, δ, is arbitrarily limited to 0.5. Thus, the predicted rating of book D for reader #3 is 8.

From the foregoing examples based upon ten books and four readers, it is believed clear how the process operates with a great many more books and a great many more readers. In one embodiment of the invention, in which the number of books exceeded one thousand, it appears that a user who rates fewer than twenty-five books generally receives either fewer predictions or less accurate predictions than users who have rated more books. This is believed due to the fact that too few books of interest are linked to two or more books rated by that user. Expanding the search to books that are indirectly linked to books rated by that user could improve the situation.

The process can be implemented in a computer program written completely from scratch, e.g. in the language known as "C" ("ANSI C", "C", "C+", "C++" etc.), which is particularly well suited to handling arrays of data. Other languages could be used instead. If implemented as a new computer program, look-up tables rather than mathematical expressions are used to implement weighting functions for maximum computing speed.

The invention has been implemented in a relational database program known as "Access". Other relational database programs could be used instead. In a relational database, not all data is stored in memory or on disk as a single file but is stored in several, related files. This is particularly advantageous to the invention because the file containing the rating pairs can grow exponentially and it is preferred to have as little other data in the file as possible.

FIG. 13 illustrates a memory map of a file containing a plurality of records in which each record included a reader number, a book number, and a rating. A second file, illustrated in FIG. 14, contains a plurality of records including reader number, reader name, demographics data (e.g. address, age, gender), and flags for rapidly grouping data (e.g. inactive reader). The data in the two files is related by the reader number, which is common to records in both files. Similarly, a separate file contains book numbers and book names, as shown in FIG. 15. This data is related to the data in FIG. 13 by book number, which is common to records in both files. Thus, one can display the data from the file illustrated in FIG. 13 but substitute reader's names and book's names for numbers, making the display easily intelligible while minimizing the amount of data in the files.

Appendix A is a script for creating the rating pairs as described above, including some debugging statements. Appendix B is a script for predicting ratings. Both of these scripts are for the "Access" database program.

The invention can be implemented in a computer programmed as a neural network. The books having a rating are represented by a layer of interconnected input units, wherein the input is the rating. The input units are interconnected by units in a hidden layer to provide the weighting function. Output units are connected to the units in the hidden layer to provide a predicted rating for a book.

Figure 16:
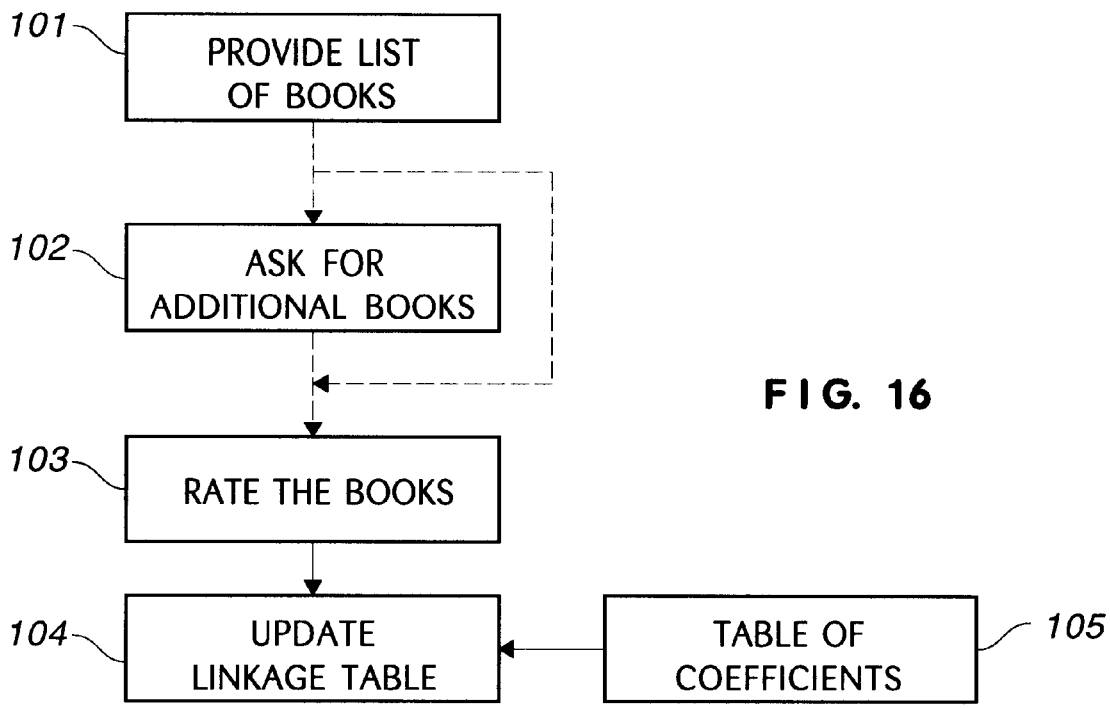
FIG. 16 is a flowchart of the process for creating a linkage table in accordance with the invention.

FIG. 16 is a flowchart of the rating process in accordance with the invention. Step 101 presents the user with a suitable screen listing the books currently known to the database. The books can be divided into groups as desired for ease in presentation and searching. Step 102 asks for additional titles. If the response is positive, a new screen is provided with the appropriate blanks for adequately identifying the book. Step 102 is optional and can be omitted if a user wishes to rate books already listed in the database.

Step 103 elicits the ratings by a reader of the particular books identified or selected. The ratings are stored in memory in association with the reader's name and in association with the book's name. Step 104 ends the reader's input and begins processing the data to create the book pairs, e.g. as illustrated in FIG. 3. Table of coefficients 105 is the same as illustrated in either FIG. 2 or FIG. 22. The coefficients favor similar ratings, as described above.

Figure 19:
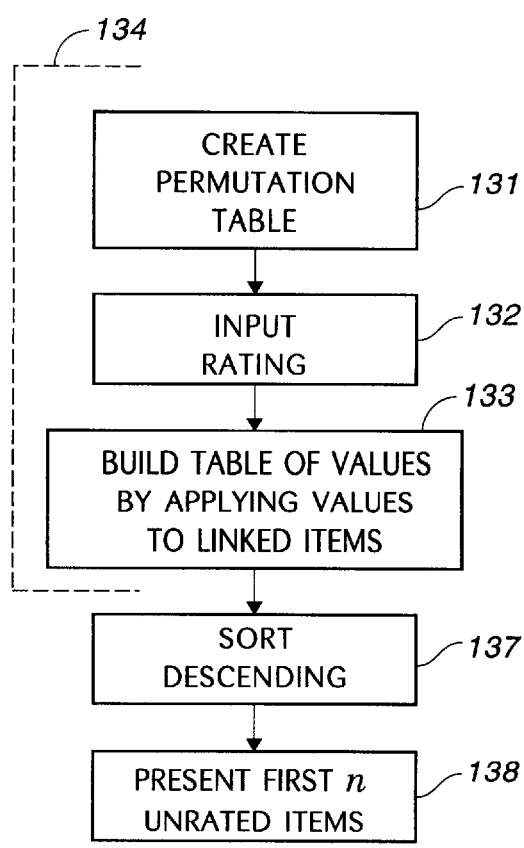
FIG. 19 is a flowchart of an alternative embodiment of a flowchart of the process for making predictions for a user.
Figures 20, 21:
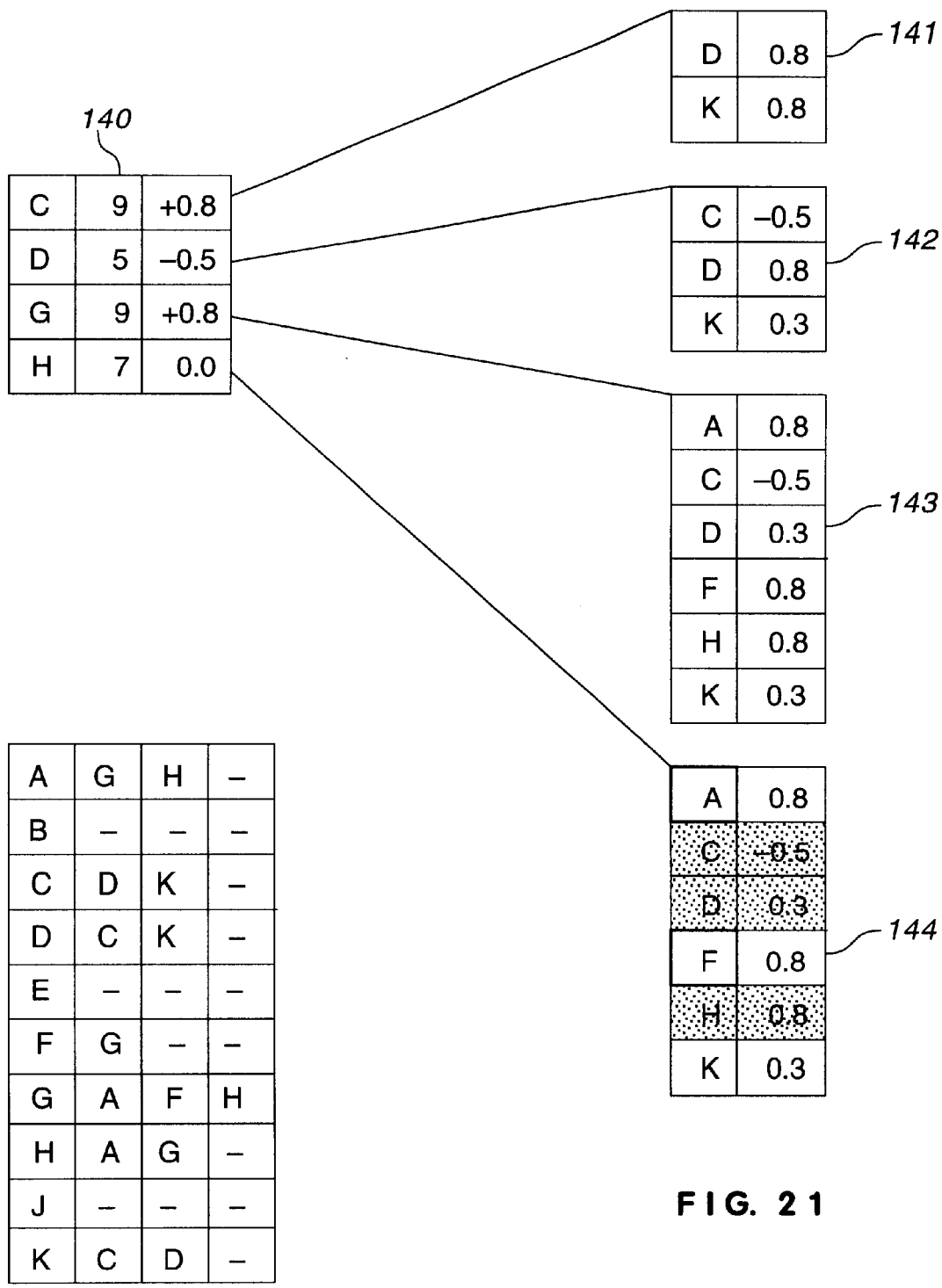
FIG. 20 illustrates a permutation table derived from table 51 (FIG. 11)
FIG. 21 illustrates building a table of values in accordance with an alternative embodiment of the invention.

Steps 107, 108, and 109 cover calculations for all books for all users and may take a considerable length of time for a large number of books, e.g. over one thousand. Preferably, the steps are executed "off-line", i.e. while the system is not being accessed by users. One could, after the program had reached a reasonable size, e.g. more than 1,000 books, make predictions based on old data while new data was being processed. This would give the appearance of immediacy and satisfy an anxious user but is not preferred. An alternative embodiment of the invention, described in connection with FIGS. 19, 20, and 21, provides immediate predictions based upon the user's ratings of some books and is the preferred way to provide immediate predictions. Greater breadth and more accurate predictions result from the off-line process illustrated in FIG. 17.

Step 107 and weighting function 108 summarize the process illustrated in FIGS. 7–11. Step 109 summarizes the steps described above in Examples 1 and 2.

Figure 18:
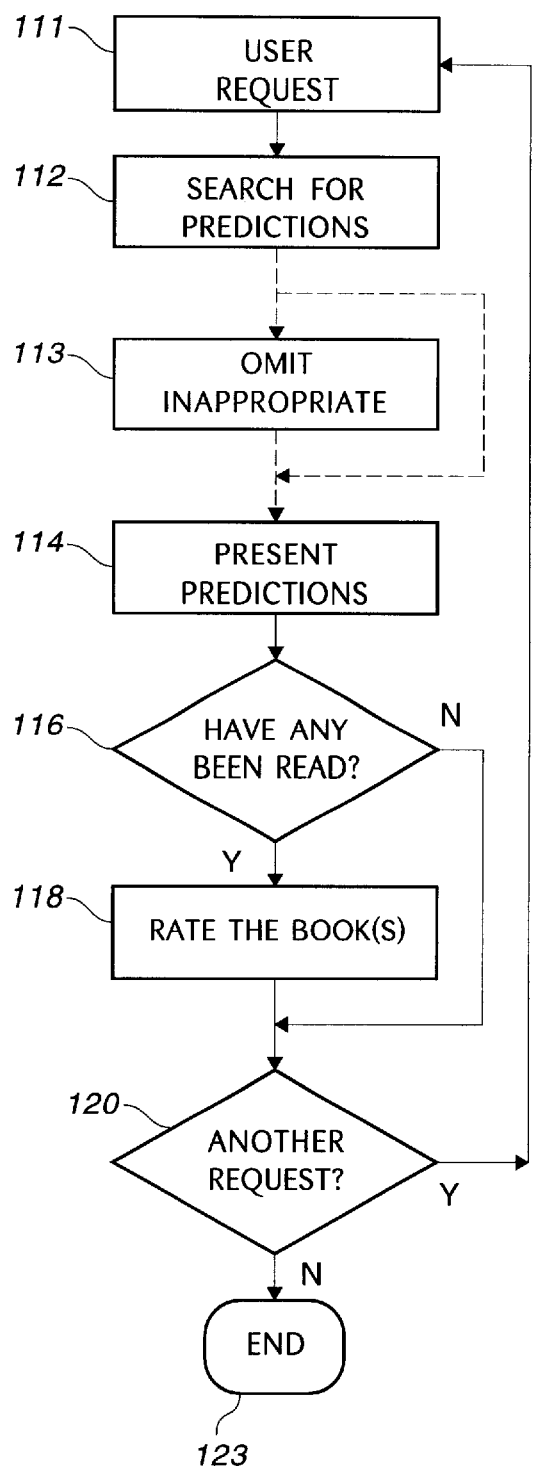
FIG. 18 is a flowchart of the process for making predictions for a user.

FIG. 18 is a flowchart for making predictions for a user on-line after the ratings for all books by all users have been processed off-line. A user is asked to enter a request in step 111. The request can be more detailed that simply asking, for example, for the five most likely books. One can refine the search by including other criteria, such as the type of book, e.g. fiction or nonfiction, or further divisions within a type, or one can restrict the search by author or some other criteria. The additional criteria are used with the calculated predictions to reduce the number of titles suggested in a typical fashion for a Boolean search (AND, OR, NOT, etc.).

In step 112, the computer performs the search according to the criteria provided. In step 113, one can optionally omit certain predictions, e.g. based upon gender. In one embodiment of the invention, it turned out that there were a disproportionate number of female readers in the database, with the result that a book like "Little Women" would be recommended to a sixty year old male reader. While the book is a classic and the gentleman enjoys classics generally, the prediction was not seen as appropriate. Step 113 allows one to accommodate age, gender, or other criteria automatically from demographic information on the reader (FIG. 14).

Figure 17:
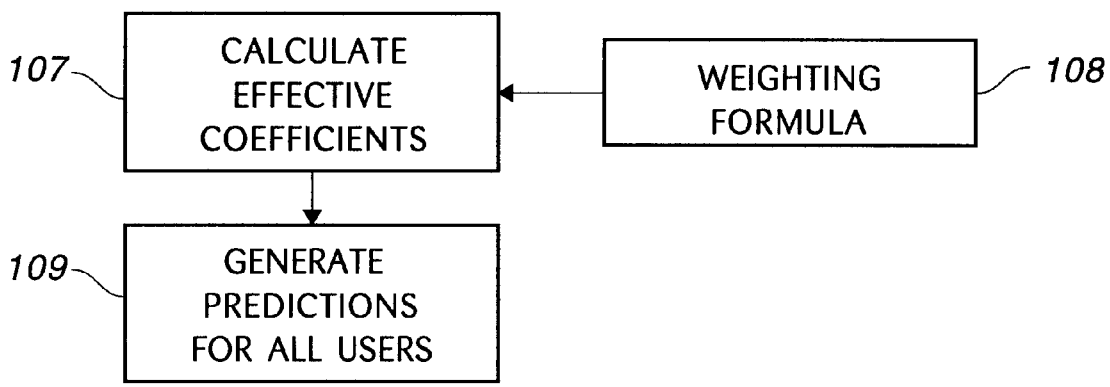
FIG. 17 is a flowchart of the process for the background calculation of predictions.

In step 114, the titles that have survived the screening process are presented to the reader with the anticipated rating. If, since last using the program, a reader may have read one or more of the books, an opportunity is provided to enter the data in steps 116 and 117. The new data has no immediate effect until the data is processed, preferably off-line (FIG. 17). Step 120 enables the user to refine the search or to end the session, step 123.

A first time user desiring immediate results can be accommodated by an alternative embodiment of the invention, illustrated in FIG. 19. This process is somewhat the reverse of the preferred embodiment in that the process starts with the user's rating of books in the database rather than upon linkages established by all the readers.

Step 131 calls for the creation of a table containing all permutations of pairs of books in the database having a weighted coefficient above the predetermined threshold. Continuing the example of ten books and four readers, FIG. 20 illustrates such a table based upon table 51 (FIG. 11). The user is then asked to rate whatever books in the database are of interest to the user, step 132. The ratings are stored and a table from the ratings as illustrated in FIG. 21.

In FIG. 21, table 140 represents the ratings of four books by a first time user. In table 140, the first column is the name of the book, the second column is the rating of the book by the user on a scale of 1–10, and the third column is an assigned value based upon the rating as follows.

| Rating | Value |
|--------|-------|
| 10     | +1.0  |
| 9      | +0.8  |
| 8      | 0.0   |
| 7      | 0.0   |
| 6      | −0.5  |
| 5      | −0.8  |
| 4      | −1.0  |
| 3      | −1.0  |
| 2      | −1.0  |
| 1      | −1.0  |

The ratings generally reflect a tendency to rate a large number of books either a 7 or an 8. Thus, only ratings above or below this value are given significance.

The values table is created as follows. In FIG. 21, the rating of book C has a value of +0.8. This value is the applied to every book linked to book C in the permutation table. Thus, as indicated by table 141, book D i s assigned a value of 0.8 and book K is assigned a value of 0.8.

In the next line, book D was rated 5, which has a value of −0.5. This value is assigned to every book linked to book D in the permutation table. Book C is linked to books C and K. Book C is added to the table. Book K is already in the table; therefore, the value for book K is the sum of the values of the ratings (0.8−0.5=0.3).

Book G is linked to three books that are not in the table, A, F, and H. These books are added to the table with the rating of book G, producing table 143. Book H is linked to books A and G (FIG. 20) but was rated 7. In this case, the rating is ignored because its value is zero, producing table 144, which is the same as table 143. This completes step 133 (FIG. 19).

As indicated by bracket 134, steps 131, 132, 133 can be combined into a single step wherein a complete table of permutations is not first generated. Instead, the appropriate lines of the values table are generated as needed, depending upon which books are rated by the user.

The values in the resulting table are then sorted, preferably in descending order, step 137, and the top n books are presented to the user, excluding the ones already read by the user. Alternatively, or in combination, books with a rating value above a predetermined threshold can be recommended to the user. As illustrated in FIG. 21, books A and F are recommended to the user.

FIG. 22 is a table of coefficients for use in step 104 and is the actual table used in a database of 1,139 books and 80 readers. Although lacking the symmetry of the table in FIG. 2, table 150 provides a prediction within 1 of an actual rating ninety-four percent of the time. This is far better than other schemes in the prior art, many of which are not even quantitative. The system was tested by deleting the rating of a book by one user, recalculating coefficients, and then asking for a prediction of a rating of that book by the user.

The invention thus provides an apparatus and method for accurately predicting a person's subjective choices based upon accurate estimates that are unaffected by individual rating patterns.

Having thus described the invention, it will be apparent to those of skill in the art that various modifications can be made within the scope of the invention. For example, it is possible to use secondary links for consistent, frequently occurring pairs of ratings. That is, one may not find more than one book rated by a user that is linked to a book in question but may find several books rated by the user that are linked to the one or more books that are linked to the book in question. Prediction could proceed on the basis of the several links, perhaps with adjustment to the weighting values. The adjustments provided by the tables described above enable one to refine the predictions significantly using real rather than test data. Although described in the context of books, the invention can be applied to many other areas of predicting behavior. Rounding off the final number for the predicted rating can be performed differently at the extremes of the ratings than in the middle. Low numbers are rounded up and high numbers are rounded down for any fractional portion. This is to accomodate the rating patterns of the actual users of the database. The sorting step in FIG. 19 can be omitted by having the computer search for the n highest values.

What is claimed is:

1. A method for computerized prediction of a person's rating of an object of art, said method comprising the steps of:

(a) storing rating data on n objects of art in at least one database in a computer;

(b) using the computer to generate up to $_nC_2$ pairs of ratings of the objects;

(c) using the computer to rank each pair of ratings according to similarity; and (d) using the computer to predict a rating for an object of interest based upon the ratings of objects linked to the object of interest by at least one pair of ratings.

2. The method as set forth in claim 1 wherein said ranking step includes the step of:

(i) using a computer to convert each pair of ratings to a number corresponding to the similarity of the ratings.

3. The method as set forth in claim 2 wherein said ranking step further includes the step of:

(ii) using the computer to reduce the rank of infrequently occurring pairs.

4. The method as set forth in claim 3 wherein said ranking step further includes the step of:

(iii) using the computer to ignore pairs below a predetermined rank.

5. The method as set forth in claim 4 wherein said ranking step further includes the step of:

(iv) using the computer to quantize the remaining ranks.

6. The method as set forth in claim 1 wherein said predicting step includes the step of:

(i) using the computer to calculate the average rating, $z$, of objects linked to the object of interest by a particular user;

(ii) using the computer to calculate the weighted average rating, $y$, by all users of objects linked to the object of interest by a particular user;

(iii) using the computer to calculate the average rating, $b$, of the object of interest by all users; and (iv) using the computer to calculate $(z-(b-y))$ as the predicted rating of the object of interest; wherein $$y = \frac{\sum (\bar{r} \cdot \rho)}{\sum \rho}$$

and $\rho$ is the ranking of the pairs of ratings.

7. The method as set forth in claim 6 wherein said predicting step includes the step of:
   (v) using the computer to round off the predicted rating to an integer.

8. The method as set forth in claim 6 wherein $\rho$ is a weighted, quantized representation of the rankings of selected pairs of ratings of objects, including the object of interest and the linked objects.

9. The method as set forth in claim 1 wherein said predicting step includes the step of using the computer to exclude objects based upon demographic data.

10. The method as set forth in claim 1 wherein said predicting step includes the step of using the computer to exclude objects based upon predetermined search criteria.

11. The method as set forth in claim 1 wherein said predicting step includes the steps of:
    (i) using the computer to build a table of values by applying values to objects linked to the objects rated by the person; and
    (ii) displaying at least the object associated with the highest value.

12. The method as set forth in claim 9 wherein said displaying step is preceded by the step of sorting the values in the table.

13. A computerized method for predicting a person's rating of an object of art, said method comprising the steps of:
    (a) storing rating data on n objects of art in at least one database in a computer;
    (b) generating up to $_nC_2$ pairs of ratings of the objects;
    (c) ranking each pair of ratings according to similarity;
    (d) eliminating the pairs below a predetermined rank;
    (e) predicting a rating for an object of interest based upon the remaining pairs.

14. The method as set forth in claim 13 wherein step (d) is followed by the step of:
    eliminating the pairs that occur only once.

15. The method as set forth in claim 13 wherein said prediction is based upon the average rating of the objects, as rated by the user, linked to the object of interest plus the difference ($\delta$) between the average rating of the object of interest, as rated by all users, minus the average ratings of the linked objects, as rated by all users in the database.

16. The method as set forth in claim 13 wherein said prediction is based upon the average of values applied to objects linked to the object of interest, wherein the values are based upon ratings of the linked objects by the user inquiring about the object of interest.

* * * * *